United States Patent
Mandot et al.

(10) Patent No.: US 11,098,185 B2
(45) Date of Patent: Aug. 24, 2021

(54) ELASTOMER COMPOSITIONS AND AUTOMOTIVE VIBRATION-DAMPING DEVICES MADE THEREWITH

(71) Applicant: ExxonMobil Chemical Patents Inc., Baytown, TX (US)

(72) Inventors: Sushil K. Mandot, Bengaluru Karnatka (IN); Babu Shanmugasundaram, Tamilnadu (IN); Ck Shanawas, Bangalore Karnataka (IN); Abhay Ray, Bangalore Karnataka (IN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 75 days.

(21) Appl. No.: 16/373,704

(22) Filed: Apr. 3, 2019

(65) Prior Publication Data

US 2019/0315958 A1  Oct. 17, 2019

Related U.S. Application Data

(60) Provisional application No. 62/658,712, filed on Apr. 17, 2018.

(51) Int. Cl.
| | |
|---|---|
| *C08L 23/28* | (2006.01) |
| *C08L 25/06* | (2006.01) |
| *C08K 3/04* | (2006.01) |
| *C08K 3/22* | (2006.01) |
| *C08K 5/09* | (2006.01) |
| *C08K 5/47* | (2006.01) |
| *F16F 13/04* | (2006.01) |

(52) U.S. Cl.
CPC .............. *C08L 23/283* (2013.01); *C08K 3/04* (2013.01); *C08K 3/22* (2013.01); *C08K 5/09* (2013.01); *C08K 5/47* (2013.01); *C08L 25/06* (2013.01); *C08K 2003/2217* (2013.01); *C08K 2003/2296* (2013.01); *C08L 2201/02* (2013.01); *F16F 13/04* (2013.01)

(58) Field of Classification Search
CPC ........... C08L 23/28; C08L 25/06; C08K 3/04; C08K 3/22; C08K 5/09; C08K 5/47
USPC ....................................................... 524/424
See application file for complete search history.

(56) References Cited

U.S. PATENT DOCUMENTS

2011/0166276 A1* 7/2011 Fujii ................. C08K 5/098
524/397

FOREIGN PATENT DOCUMENTS

JP       3308277 B2 *  7/2002  ............ F16F 1/3605
JP       2010-43257 A  *  2/2010

* cited by examiner

*Primary Examiner* — Deve V Hall

(57) ABSTRACT

Elastomer compositions and, in particular, their use as compositions for forming vibration-damping devices. The elastomer compositions comprise brominated isobutylene-co-alkylstyrene, such as brominated isobutylene-co-para-methylstyrene. One or more additives including a reinforcing filler, a processing aid, a scorch retarder, a curing agent, an activator, an accelerator, and any combination thereof may be included in the elastomer composition. The elastomer compositions exhibit physical properties, heat resistance properties, and long life cycle properties making their use in vibration-damping devices particularly suitable.

6 Claims, 3 Drawing Sheets

ELASTOMER COMPOSITIONS AND AUTOMOTIVE VIBRATION-DAMPING DEVICES MADE THEREWITH

CROSS-REFERENCE TO RELATED APPLICATIONS

This application claims priority to U.S. Ser. No. 62/658,712, filed Apr. 17, 2018, herein incorporated by reference.

FIELD

This application relates to elastomer compositions and, in particular, their use as compositions for forming vibration-damping devices.

BACKGROUND

During use of an automobile, various forces (e.g., acceleration, deceleration, inertial, etc.) and external stimuli (e.g., terrain quality) act upon the automobile and cause vibration of the automobile body itself, as well as the various components that make up the automobile (e.g., engine components, door and trunk components, etc.). Such vibration can result in sound vibration transmission into the interior of the automobile that is uncomfortable for occupants thereof (e.g., loud or distracting pitch frequency), and can further result in malfunction, damage, or breakage of various components of the automobile, particularly those components that are exceptionally susceptible to vibration and/or require supporting structures to abate vibration.

Accordingly, various components and structures (collectively "devices") of automobiles must be manufactured to exhibit damping qualities. Moreover, many of these automotive devices must maintain flexibility, further contributing to damping, and be configured to withstand harsh external or environmental conditions, including weather conditions, wind forces during use of the automobile, extreme heat generated by the automobile itself, and the like. For example, the automotive device may be a hanger or other support that secures one or more automotive parts in place, such as a tubular member or pipe. An exhaust pipe hanger, also known as an exhaust pipe support or simply exhaust support, is one example of such an automotive support device.

An exhaust pipe hanger forms a portion of an automobile's exhaust system, which is suspended beneath an automobile and subject to external environmental conditions. The exhaust system includes one or more exhaust pipes through which combusted gasses are conveyed away from the engine and automobile, and released into the environment. The internal forces from the combustion pressure in the exhaust system causes vibrations that propagate through the one or more exhaust pipes. These vibrations can cause sound frequency, as discussed above, but can also render the exhaust pipes and associated components of the exhaust system vulnerable to such vibrations, which can cause detachment, damage, or other problems.

One or more exhaust pipe hangers function as a mount to secure and support the one or more exhaust pipes to the underside of an automobile. In so doing, the exhaust pipe hangers provide structural support to the exhaust pipes, requiring sufficient damping to reduce vibration and protect the exhaust pipe and the exhaust system as a whole, sufficient flexibility to withstand various terrain and other external conditions during operation of the automobile and sufficient protection from external environmental conditions, such as extreme heat.

Typically, such vibration-damping automotive devices (e.g., supports and the like) are composed of compression or injection molded chlorobutyl rubber. Chlorobutyl rubber is a preferred compositional polymer for these automotive devices because it has known damping attributes and exhibits temperature resistance. Enhancing these damping temperature resistance attributes, as well as ensuring the necessary additional qualities for automotive vibration-damping devices is desirable to increase or enhance the life span and operability thereof.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
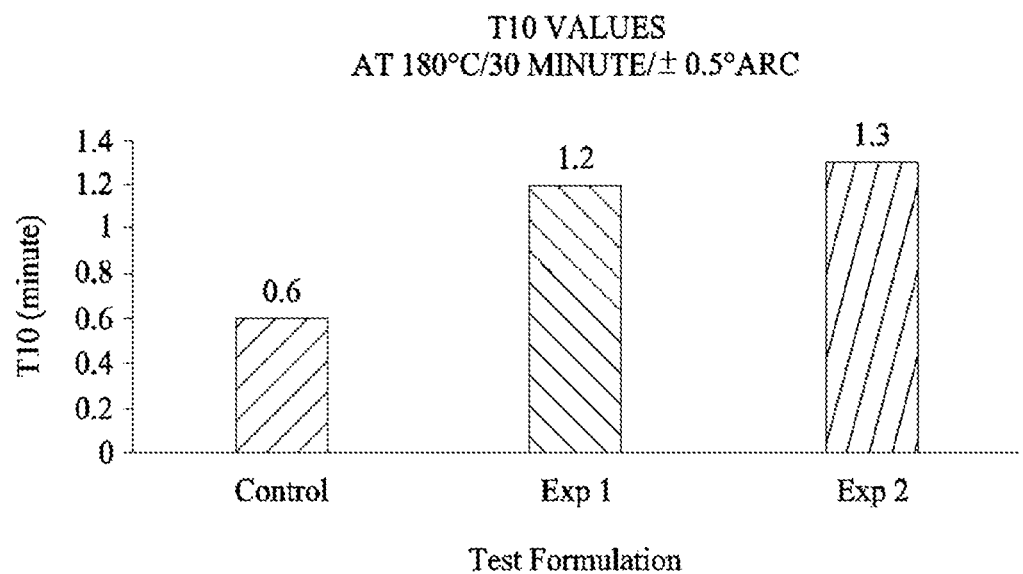
FIG. 1 shows T10 scorch safety at 180° C. values for elastomer compositions of the present disclosure comprising brominated isobutylene-co-styrene as compared to traditional chlorobutyl rubber compositions, according to one or more embodiments described herein.

This application relates to elastomer compositions and, in particular, their use as compositions forming vibration-damping devices.

One or more illustrative embodiments incorporating the embodiments of the present disclosure are included and presented herein. Not all features of a physical implementation are necessarily described or shown in this application for the sake of clarity. It is understood that in the development of a physical embodiment incorporating the embodiments of the present disclosure, numerous implementation-specific decisions must be made to achieve the developer's goals, such as compliance with system-related, businessrelated, government-related, and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as physical properties, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

When numerical lower limits and numerical upper limits are listed herein, ranges from any lower limit to any upper limit are contemplated, whether or not explicitly listed.

While compositions and methods are described herein in terms of "comprising" various components or steps, the compositions and methods, can also "consist essentially of" or "consist of" the various components and steps.

All priority documents, patents, publications, and patent applications, test procedures (such as ASTM methods), and other documents cited herein are fully incorporated by reference to the extent such disclosure is not inconsistent with this disclosure and for all jurisdictions in which such incorporation is permitted.

Various terms as used herein are defined below. To the extent a term used in a claim is not defined below, it should be given the broadest definition persons in the pertinent art have given that term as reflected in one or more printed publications or issued patents.

As used herein, the term "vibration," and grammatical variants thereof, refers to the mechanical oscillation, reciprocation, or other periodic motion of a rigid or elastic material forced (e.g., by frictional force) from a position or state of equilibrium. The term "vibration" may be used interchangeably with the term "shake," and grammatical variants thereof.

As used herein, the term "vibration damping" or "vibration-damping," and grammatical variants thereof, refers to a decrease in the amplitude of a vibration and oscillation because of energy being dissipated. As used herein, "vibration-damping device," and grammatical variants thereof, refers to any article made or adapted for imparting vibration damping qualities to itself and/or a different article. An "automotive vibration-damping device," and grammatical variants thereof, as used herein, refers to any vibration-damping device adapted for use in connection with the functioning of an automobile.

As used herein, the term "automobile" or "automotive," and grammatical variants thereof, refers to any motor-driven vehicle used for motorized transportation of people, animals, and/or goods that experience vibration during use. For example, the automobile may be a vehicle with a combustion engine having an exhaust system identical or substantially similar to that described hereinabove.

As used herein, the term "elastomer," and grammatical variants thereof, refers to any polymer that exhibits elastic properties, including viscoelastic properties (viscosity and elasticity), and that can be cured by any means. The term "elastomer" may be used interchangeably with the term "rubber," and is consistent with the definition in ASTM D1566. An "elastomer composition," as used herein and grammatical variants thereof, refers to any composition comprising an elastomer.

As used herein, the term "pphr" or "phr," which may be used interchangeably, means parts per hundred rubber, and is a measure of components within a composition relative to the total weight of elastomer(s), based on 100 parts by weight of the elastomer(s). Measurement in "pphr" is a measurement unit commonly known by those of skill in the art.

As used herein, the term "cure," and grammatical variants thereof (e.g., curing), refers to both crosslinking reactions and the process(es) used to achieve crosslinking of polymer chains within an elastomer or elastomer composition. The term "cure" may be used interchangeably with the term "vulcanize," and grammatical variants thereof.

As used herein, the term "curing agent," and grammatical variants thereof (e.g., cure agent), refers to a compound that is used to cause a cure of an elastomer or elastomeric composition. The term "curing agent" may be used interchangeably with the terms "crosslinking agent," "curative," and "vulcanizing agent." Examples of curing agents may include, but are not limited to, sulfur, metal oxides, metal ligand complexes, phenolic compounds (e.g., resins), and any combination thereof.

The term "activator," and grammatical variants thereof, refers to an additive that renders one or more additional components in the elastomer composition effective for use, thereby supporting curing (vulcanization). An example of such activator includes fatty acids for rendering one or more curing agents soluble and thus effective for use during processing of an elastomer composition. The term "activator" may be used interchangeably with the term "releasing agent."

As used herein, the term "reinforcing filler material" or simply "reinforcing material," and grammatical variants thereof, refers to any compound or material included in combination with an elastomer or elastomer composition used to improve the mechanical properties thereof, such as elasticity, flexibility, or stiffness, and the like.

As used herein, the term "processing aid," and grammatical variants thereof, refers to an additive added to an elastomer composition of the present disclosure to at least enhance the processability of the elastomer composition. When the processing aid is an oil, the term "processing aid" may be used interchangeably with the terms "process oil," "processing oil," and "softening oil."

As used herein, the term "accelerator," and grammatical variants thereof refers to an additive that promotes acceleration of the cure process of an elastomer composition. Examples of accelerators include organic compounds, amines, guanidines, thioureas, thiazoles, thiurams, sulfenamides, sulfenimides, thiocarbamates, xanthates, and the like, and any combination thereof.

As used herein, the term "scorch retarder," and grammatical variants thereof, refers to an additive that when present is capable of reducing the temperature coefficient of scorching of an elastomer composition. That is, a scorch retarder reduces the formation of scorch during formulation of an elastomer composition, such as during curing (vulcanization) and/or extrusion or forming. In certain instances, a scorch retarder may additionally impart qualities of a curing agent (e.g., provide crosslinking performance).

As used herein, the term "alkyl," and grammatical variants thereof, refers to a paraffinic hydrocarbon group which may be derived from an alkane by removing one or more hydrogens, such as, a methyl group ($CH_3$), an ethyl group ($CH_2CH_3$), and the like.

As used herein, the term "isobutylene-based elastomer" or "isobutylene-based elastomer composition," and grammatical variants thereof, refers to a polymer comprising at least 70 mole % (mol %) repeat units from isobutylene.

As used herein, the term "isoolefin," and grammatical variants thereof, refers to any olefin monomer having at least one carbon having two substitutions. The term "multiolefin," and grammatical variants thereof, as used herein, refers to any olefin monomer having two or more double bonds.

As used herein, the term "masterbatch," and grammatical variants thereof (e.g., "master batch"), refers to a solid elastomer product in which concentrated additives are dispersed at high concentration. The term "masterbatch" may be used interchangeably with the terms "non-productive" or "non-productive batch."

As used herein, the term "finalization," and grammatical variant thereof (e.g., "finalized") refers to the addition of components to a masterbatch to achieve curing (vulcanization) of an elastomer composition.

Elastomer Composition

In some embodiments of the present disclosure, a vibration-damping device, such as an automotive vibration-damping device, is provided comprising an elastomer composition including a brominated isobutylene-co-alkylstyrene. Such elastomer composition is superior in one or more respects, as described herein, to traditional use of chlorobutyl rubber for providing at least damping and heat resistance qualities. Traditional chlorobutyl rubber for use in forming a vibration-damping device may have the general butyl rubber structure of Formula I, with one or more, or typically all, of the chlorine-comprising isoprenyl units shown in Formulas II-IV.

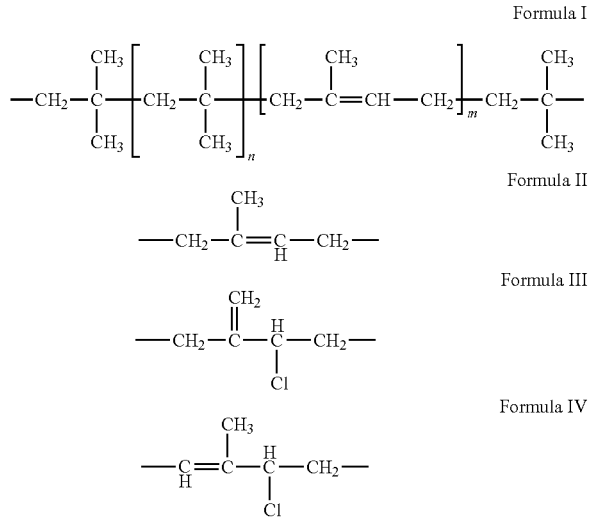

Formula I

Formula II

Formula III

Formula IV

While traditional chlorobutyl rubber provides at least damping and heat resistance qualities, formulations for use as vibration-damping devices that increase the life of such devices are desirable. The elastomer compositions of the present disclosure comprise brominated isobutylene-co-alkylstyrene, which provides, among other things, high temperature resistance (at 175° C.), high retention properties (e.g., tensile, tear, and elongation), high energy at break after hot aging, among other things. In some compositions of the present disclosure, the brominated isobutylene-co-alkylstyrene further imparts low compression set to a vibration-damping device.

The elastomer composition of the present disclosure comprises brominated isobutylene-co-alkylstyrene, which may be characterized by at least one random copolymer comprising a $C_4$ to $C_9$ isoolefins, including isobutylene and alkylstyrene comonomer (e.g., -methylstyrene). In some embodiments, the alkylstyrene is methylstyrene or, more particularly, para-methylstyrene. In some embodiments, the copolymer comprises about 0.5 mol % to about 20 mol % alkylstyrene, such as methylstyrene or para-methylstyrene, encompassing any value and subset there between, such as a lower limit of about 0.5 mol %, 1 mol %, 2 mol %, 3 mol %, 4 mol %, 5 mol %, 6 mol %, 7 mol %, 8 mol %, 9 mol %, or 10 mol % to an upper limit of about 20 mol %, 19 mol %, 18 mol %, 17 mol %, 16 mol %, 15 mol %, 14 mol %, 13 mol %, 12 mol %, 11 mol %, or 10 mol %, encompassing any value and subset there between.

The elastomer compositions of the present disclosure may be a brominated isobutylene-co-alkylstyrene having the following monomer units randomly or uniformly spaced throughout:

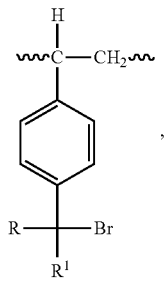

Formula V where R and $R^1$ are independently hydrogen or a lower alkyl, such as a C1 to C6 alkyl or a primary or secondary alkyl halide. In some embodiments, up to about 60% by weight of the alkylstyrene (e.g., methylstyrene or para-methyl styrene) comprises the brominated monomer of Formula V, or in the range of about 10% to about 60% by weight of the alkylstyrene, encompassing any value and subset there between. For example, the brominated monomer of Formula V may be present in a lower limit of about 10%, 15%, 20%, 25%, 30%, or 35% to an upper limit of about 60%, 55%, 50%, 45%, 40%, or 35% by weight of the alkylstyrene, encompassing any value and subset there between. In one embodiment, the amount of bromine (Br) in the brominated isobutylene-co-alkylstyrene is in the range of about 0.1 mol % to about 5 mol % of the brominated isobutylene-co-alkylstyrene, encompassing any value and subset there between, such as a lower limit of about 0.1 mol %, 0.5 mol %, 1.0 mol %, 1.5 mol %, 2.0 mol %, or 2.5 mol % to an upper limit of about 5 mol %, 4.5 mol %, 4.0 mol %, 3.5 mol %, 3.0 mol %, or 2.5 mol % of the brominated isobutylene-co-alkylstyrene, encompassing any value and subset there between. In some embodiments, the amount of Br is in the range of about 0.2 mol % to about 3.0 mol %, or about 0.3 mol % to about 2.8 mol %, or about 0.4 mol % to about 2.5 mol % of the brominated isobutylene-co-alkylstyrene, encompassing any value and subset there between.

In some embodiments, the brominated isobutylene-co-alkylstyrene has a substantially homogeneous compositional distribution such that at least about 90% by weight of the alkylstyrene, or 95% by weight of the alkylstyrene, is methylstyrene, encompassing any value and subset there between, including up to 100% by weight. In some embodiments, the brominated isobutylene-co-alkylstyrene have a substantially homogeneous compositional distribution such that at least about 90% by weight of the alkylstyrene, or 95% by weight of the alkylstyrene is para-methylstyrene, encompassing any value and subset there between, including up to 100% by weight.

In some embodiments, the brominated isobutylene-co-alkylstyrene copolymer is brominated isobutylene-co-para-methylstyrene having about 0.1 mol % to about 5 mol % bromomethylstyrene groups (e.g., the bromine content) relative to the total amount of monomer units in the copolymer. In some embodiments, about 0.2 mol % to about 3.0 mol %, or about 0.3 mol % to about 2.8 mol %, or about 0.4 mol % to about 2.5 mol % of the brominated isobutylene-co-para-methylstyrene are bromomethylstyrene groups, encompassing any value and subset there between. In yet other embodiments, the amount of bromomethylstyrene groups in the brominated isobutylene-co-para-methylstyrene is about 0.3 mol % to about 0.6 mol %, encompassing any value and subset there between, such as a lower limit of about 0.3 mol %, 0.33 mol %, 0.36 mol %, 0.39 mol %, 0.42 mol %, or 0.45 mol % to an upper limit of about 0.6 mol %, 0.57 mol %, 0.54 mol %, 0.51 mol %, 0.48 mol %, or 0.45 mol % of the brominated isobutylene-co-para-methylstyrene, encompassing any value and subset there between. In one or more embodiments, the amount of bromomethylstyrene groups in the brominated isobutylene-co-para-methylstyrene is in the range of about 0.4 mol % to about 0.55 mol %, or more particularly about 0.42 mol % to about 0.52 mol %, encompassing any value and subset there between.

In some embodiments, the brominated isobutylene-co-para-methylstyrene of the present disclosure has the chemical formula of Formula VI.

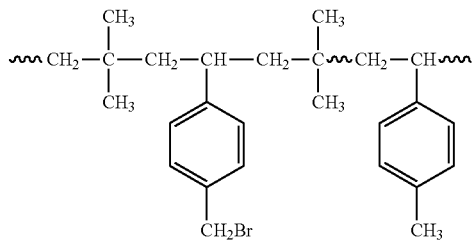

Formula VI

A commercial embodiment of the brominated isobutylene-co-para-methylstyrene of the present disclosure includes EXXPRO™ elastomers, available from ExxonMobil Chemical Company, Houston, Tex., having a Mooney viscosity of about 30-50 (ML 1+8 at 125° C., ASTM D1646) and a bromine content of from about 0.4 mol % to about 2.2 mol %.

In some embodiments, the brominated isobutylene-co-methylstyrene is included in the elastomer compositions of the present disclosure in an amount in the range of about 55% to about 80% by weight of the elastomer composition, encompassing any value and subset there between, such as a lower limit of about 55%, 57.5%, 55%, 57.5%, 60%, 62.5%, or 65% to an upper limit of about 80%, 77.5%, 75%, 72.5%, 70%, 67.5%, or 65% by weight of the elastomer composition, encompassing any value and subset there between. In some embodiments, for example, the brominated isobutylene-co-methylstyrene is included in the elastomer composition in an amount in the range of about 55% to 75%, or 55%, to 70%, or 60% to 70%, or 60% to 65%, or 61% to 64% by weight of the elastomer composition, encompassing any value and subset there between.

Additives

The elastomer composition of the present disclosure comprising brominated isobutylene-co-alkylstyrene (e.g., brominated isobutylene-co-para-methylstyrene) may comprise one or more additives designed to impart certain properties to the cured (vulcanized) elastomer composition, such as tensile strength, wear resistance, heat resistance, and the like. Such additives may include, but are not limited to, a reinforcing filler, a processing aid, a scorch retarder, a curing agent, an activator, an accelerator, and any combination thereof.

Suitable examples of reinforcing fillers for use in the elastomer compositions of the present disclosure include, but are not limited to, carbon black, calcium carbonate, silica, clay and other silicates which may or may not be exfoliated, mica, talc, titanium dioxide, and any combination thereof.

The reinforcing fillers for use in the elastomer composition of the present disclosure may be of any size and shape. Generally, the size of the reinforcing fillers (i.e., diameter) is in the range of about 0.0001 micrometers (μm) to about 10 μm, encompassing any value and subset there between, such as from a lower limit of about 0.0001 μm, 0.001 μm, 0.01 μm, 0.1 μm, 1 μm, 10 μm, 20 μm, 30 μm, 40 μm, or 50 μm to an upper limit of about 100 μm, 90 μm, 80 μm, 70 μm, 60 μm, or 50 μm, encompassing any value and subset there between.

In one or more embodiments, the selected reinforcing filler is carbon black, which may be modified and/or unmodified, and combinations thereof. In one or more embodiments, the selected reinforcing filler is carbon black, modified and/or unmodified, in combination with one or more additional reinforcing fillers, such as silica. Other combinations may also be used, without departing from the scope of the present disclosure, provided that the qualities of the cured elastomer composition described herein are met.

In some embodiments, the reinforcing filler material is present in an amount of from about 30 to about 80 phr of the elastomer composition, encompassing any value and subset there between, such as from a lower limit of about 30 phr, 35 phr, 40 phr, 45 phr, 50 phr, or 55 phr to an upper limit of about 80 phr, 75 phrl 70 phr, 65 phr, 60 phr, or 55 phr of the elastomer composition, encompassing any value and subset there between. In one or more embodiments, the reinforcing filler material is present in an amount of from about 35 phr to about 55 phr, or about 40 phr to about 50 phr of the elastomer composition, encompassing any value and subset there between. In some embodiments, the reinforcing filler material is present in the elastomer composition in an amount of from about 20% to about 50% by weight of the elastomer composition, encompassing any value and subset there between, such as from a lower limit of about 20%, 23%, 26%, 29%, 32%, or 35% to an upper limit of about 50%, 47%, 44%, 41%, 38%, or 35% by weight of the elastomer composition, encompassing any value and subset there between.

Suitable processing aids may be included in the elastomer compositions of the present disclosure to affect the properties of the final elastomer composition, including its use as a vibration-damping device, and to assist in the processing of the elastomer composition. Examples of suitable processing aids for use in the embodiments of the present disclosure may include, but are not limited to, aromatic oils, paraffinic oils, naphthenic oils, vegetable oils, and any combination thereof. In certain specific embodiments, the processing aid may be one or more of castor oil and/or paraffinic oil. In some instances, the selected processing aid may have a high viscosity, such as greater than about 11 square millimeters per second ($mm^2/s$) at 100° C.; such high viscosity processing aids may have enhanced aging properties. In other embodiments, a low viscosity processing aid may be used, such as naphthenic oil, without departing from the scope of the present disclosure.

The processing aid may be included in the elastomer compositions of the present disclosure in an amount sufficient to impart the desired properties and/or processability to the elastomer composition. For example, the processing aid may soften the elastomer composition or provide lubrication, among other things, to facilitate mixing operations, reduce compounding time, and/or modify the physical properties of the final elastomer composition and devices made therefrom. In some embodiments, the processing aid may be present in the elastomer compositions of the present disclosure in an amount of from about 0.3 phr to about 20 phr, encompassing any value and subset there between, such as from a lower limit of about 0.3 phr, 1 phr, 2.5 phr, 5 phr, 7 phr, 9 phr, or 11 phr to an upper limit of about 20 phr, 18 phr, 16 phr, 14 phr, 12 phr, or 10 phr of the elastomer composition, encompassing any value and subset there between. In some embodiments, the processing aid is present in the elastomer composition in an amount of from about 0.15% to about 15% by weight of the elastomer composition, encompassing any value and subset there between, such as from a lower limit of about 0.15%, 0.5%, 1%, 2%, 3%, 4%, 5%, 6%, 7%, 8%, or 9% to an upper limit of about 15%, 14%, 13%, 12%, 11%, 10%, or 9% by weight of the elastomer composition, encompassing any value and subset there between.

In some embodiments, the elastomer compositions of the present disclosure may include one or more scorch retarders. Examples of suitable scorch retarders for use in the elastomer compositions of the present disclosure may include, but are not limited to, magnesium oxide, aluminum oxide, hydroxide, carbonates, organic acid salts of metals, and the like, and any combination thereof. Magnesium oxide scorch retarder may be particularly effective in elastomer compositions comprising halogenated butyl, such as the brominated isobutylene-co-alkylstyrene of the present disclosure. In some embodiments, the scorch retarder may be present in the elastomer compositions of the present disclosure in an amount of from about 0.02 phr to about 2 phr, encompassing any value and subset there between, such as from a lower limit of about 0.02 phr, 0.2 phr, 0.4 phr, 0.6 phr, 0.8 phr, or 1 phr to an upper limit of about 2 phr, 1.8 phr, 1.6 phr, 1.4 phr, 1.2 phr, or 1 phr of the elastomer composition, encompassing any value and subset there between. In some embodiments, the processing aid is present in the elastomer composition in an amount of from about 0.01% to about 1.5% by weight of the elastomer composition, encompassing any value and subset there between, such as from a lower limit of about 0.01%, 0.1%, 0.15%, 0.03%, 0.45%, 0.6%, 0.75% to an upper limit of about 1.5%, 1.35%, 1.2%, 1.05%, 0.9%, or 75%, or 9% by weight of the elastomer composition, encompassing any value and subset there between.

The elastomer compositions of the present disclosure may include one or more curing agents (or crosslinking agents) which aid in curing the elastomer compositions of the present disclosure. The physical properties, performance characteristics, and durability of a cured (vulcanized) elastomer composition are directly related to the number (density) and type of crosslinks formed during the curing process. Examples of curing agents may include, but are not limited to, sulfur, metal oxides, metal carboxylates, organometallic compounds, radical inducers, phenolic compounds, and the like, and any combination thereof.

The curing agent for use in the elastomer compositions of the present disclosure may include any number of components such as a metal or metal ligand complex, a resin, an organosilane, or other curing agents, and any combination thereof. In some embodiments, the curing agent is at least a Group 2-14 metal oxide or metal ligand complex, wherein at least one ligand is able to undergo a substitution reaction with the inducer compound. In some embodiments, the at least one curing agent is a metal oxide which including, but not limited to, zinc oxide, magnesium oxide, calcium oxide, aluminum(I) oxide, chromium trioxide, iron(II) oxide, iron (III) oxide, nickel(II) oxide, hydrated lime, alkali carbonates, hydroxides, and any combination thereof. In certain embodiments, the metal-based curing agents selected for use in the elastomer compositions of the present disclosure may include zinc oxide. These metal oxides can be used in conjunction with the any other curing agent(s) described herein, such as in combination with a phenolic curing agent.

Alone or in conjunction with any one or more of the curing agents described herein, an additional suitable curing agent for use in the elastomer compositions of the present disclosure include phenolic compound. Suitable examples of phenolic compounds that may be used as curing agents include, but are not limited to octyl phenyl resins, alkylphenol disulfides, melamine-based phenyl resins, and any combination thereof. In certain embodiments, the phenolic compound selected for use in the elastomer compositions of the present disclosure is octylphenol formaldehyde resin and/or alkylphenol disulfide. In some instances, the phenolic compound may additionally impart antioxidant qualities to the elastomer composition, which may beneficially protect one or more components of the elastomer composition from degradation. For example, alkylphenol disulfide may act as both a curing agent and an antioxidant.

In some embodiments, the curing agent, even when additionally acting as an antioxidant, may be present in the elastomer compositions of the present disclosure in an amount of from about 0.5 phr to about 10 phr, encompassing any value and subset there between, such as from a lower limit of about 0.5 phr, 1 phr, 2 phr, 3 phr, 4 phr, or 5 phr to an upper limit of about 10 phr, 9 phr, 8 phr, 7 phr, 6 phr, or 5 phr of the elastomer composition, encompassing any value and subset there between. In certain embodiments, the curing agent is present in an amount of from about 0.5 to about 6 phr, or about 1 to about 5 phr, or about 3 to 6 phr in the elastomer composition, encompassing any value and subset there between. In some embodiments, the curing agent is present in the elastomer composition in an amount of from about 0.3% to about 7% by weight of the elastomer composition, encompassing any value and subset there between, such as from a lower limit of about 0.3%, 0.7%, 1.4%, 2.1%, 2.8%, or 3.5% to an upper limit of about 7%, 6.3%, 5.6%, 4.9%, 4.2%, or 3.5% by weight of the elastomer composition, encompassing any value and subset there between.

When the selected curing agent is a metal oxide, for example, an activator may be included in the elastomer composition to cause the metal oxide to be effective at providing the sufficient curing (crosslinking). Such activators may include, but are not limited to, a fatty acid, such as stearic acid, oleic acid, lauric acid, palmitic acid, myristic acids, and the like, and any combination thereof. For example, a stearic acid activator (or other fatty acid activator) may be included to render a zinc oxide curing agent (or other metal oxide curing agent) soluble in the elastomer composition. In some embodiments, the activator may additionally serve another function, such as use as a processing aid. For example, fatty acids, such as stearic acid, can effectively impart lubrication, reversion resistance, act as a softener, act as a reinforcing filler dispersant, and the like.

The activator, even when additionally acting as a processing aid, may be included in the elastomer compositions of the present disclosure in an amount of from about 0.1 phr to about 5 phr, encompassing any value and subset there between, such as from a lower limit of about 0.1 phr, 0.5 phr, 1 phr, 1.5 phr, 2 phr, or 2.5 phr to an upper limit of about 5 phr, 4.5 phr, 4 phr, 3.5 phr, 3 phr, or 2.5 phr, encompassing any value and subset there between. In some embodiments, the activator is present in the elastomer composition in an amount of from about 0.06% to about 3% by weight of the elastomer composition, encompassing any value and subset there between, such as from a lower limit of about 0.06%, 0.1%, 0.3%, 0.6%, 0.9%, 1.2%, or 1.5% to an upper limit of about 3%, 2.7%, 2.4%, 2.1%, 1.8%, or 1.5% by weight of the elastomer composition, encompassing any value and subset there between.

The elastomer compositions described herein may further comprise an accelerator to accelerate the curing of the elastomer composition. The mechanism for accelerated curing (vulcanization) involves complex interactions between at least the curing agent(s), accelerator(s), and elastomer itself (e.g., the brominated isobutylene-co-alkylstyrene of the present disclosure). In preferred embodiments, all of the curing agent is consumed in the formation of effective crosslinks within the elastomer composition, thus enhancing the overall strength of the cured elastomer composition and, thus, any devices made therefrom. Examples of accelerators may include, but are not limited to amines, guanidines, thioureas, thiazoles, thiurams, sulfenamides, sulfenimides, thiocarbamates, xanthates, and the like, and any combination thereof.

Specific examples of accelerators for use in the present disclosure include, but are not limited to, diphenyl guanidine (DPG), tetramethylthiuram disulfide (TMTD); 4,4'-dithiodimorpholine (DTDM); tetrabutylthiuram disulfide (TBTD); 2,2'-benzothiazyl disulfide (MBTS) (also referred to as mercaptobenzothiazole disulfide); zinc dibutyldithiocarbamate (ZnBDC); hexamethylene-1,6-bisthiosulfate disodium salt dihydrate; 2-(morpholinothio) benzothiazole (MBS or MOR); blends of 90% MOR and 10% MBTS; N-tertiarybutyl-2-benzothiazole sulfenamide (TBBS); N-oxydiethylene thiocarbamyl-N-oxydiethylene sulfonamide (OTOS); zinc 2-ethyl hexanoate (ZEH); N, N'-diethyl thiourea; and the like; and any combination thereof. In certain embodiments, the selected accelerator for use in the elastomer compositions of the present disclosure are MBTS, ZnBDC, and any combination thereof.

In some embodiments, the accelerator may be present in the elastomer compositions of the present disclosure in an amount of from about 0.1 phr to about 6 phr, encompassing any value and subset there between, such as from a lower limit of about 0.1 phr, 0.6 phr, 1.2 phr, 1.8 phr, 2.4 phr, or 3 phr to an upper limit of about 6 phr, 5.4 phr, 4.8 phr, 4.2 phr, 3.6 phr, or 3 phr of the elastomer composition, encompassing any value and subset there between. In certain embodiments, the curing agent is present in an amount of from about 0.1 to about 5 phr, or about 0.5 to about 5 phr, or about 1 to 2 phr, in the elastomer composition, encompassing any value and subset there between. In some embodiments, the accelerator is present in the elastomer composition in an amount of from about 0.06% to about 4% by weight of the elastomer composition, encompassing any value and subset there between, such as from a lower limit of about 0.06% to an upper limit of about 7%, 6.3%, 5.6%, 4.9%, 4.2%, or 3.5% by weight of the elastomer composition, encompassing any value and subset there between.

The elastomer composition of the present disclosure may further comprise any additional additives provided that the additives do not interfere with the characteristics of the cured elastomer composition, as described herein below. Such additives may include those customarily included in rubber mixes, such as effective amounts of pigments, antioxidants, antiozonants, elastomers in addition to the brominated isobutylene-co-alkylstyrene, and the like, and any combination thereof.

Processing the Elastomer Composition

The elastomer compositions of the present disclosure may be reactor blends and/or melt mixes. Mixing of the various components of the elastomer compositions described herein may be carried out by combining at least the polymer component (i.e., the brominated isobutylene-co-alkylstyrene and any additional elastomers, if included), the reinforcing filler, the processing aid, and in some instances, one or more scorch retarders and/or activators in any suitable mixing device such as a two-roll open mill, BRABENDER™ internal mixer, BANBURY™ internal mixer with tangential rotors, KRUPP™ internal mixer with intermeshing rotors, or any other mixer and/or extruder, by techniques known by those of skill in the art. Initial mixing of the elastomer compositions described herein may be performed at temperatures in the range of from up to the melting point of the elastomer and/or any secondary rubber used in the elastomer composition in one embodiment, from about 40° C. up to 250° C. in another embodiment, and from about 100° C. to 200° C. in yet another embodiment, under conditions of shear sufficient to allow various included additives to become uniformly dispersed within the elastomer(s) to form a masterbatch.

Typically, from about 70% to 100% of the elastomer component (i.e., the brominated isobutylene-co-alkylstyrene and any additional elastomers, if included) may be initially mixed for about 20 to 90 seconds, or until the temperature reaches about 40° C. to 75° C. Thereafter, about 60% to 75% of the reinforcing filler, and the remaining amount of elastomer, if any, are typically added to the mixer, and mixing continues for about 30 to 90 seconds, or until the temperature reaches about 90° C. to 150° C. Next, the remaining reinforcing filler is added, as well as any processing aid and, when applicable, scorch retarders and/or activators, and mixing continues until the dump temperature is reached, generally about 120° C. to 190° C. One or more ram sweeps may be performed during formulation of the masterbatch.

The masterbatch is finalized to form the cured elastomer compositions of the present disclosure, for use in forming the vibration-damping devices described herein, for example. Typically, the remaining components (i.e., additives) of the elastomer composition, including certain curing agents and accelerators, are mixed with the masterbatch for approximately 60 to 200 seconds under shear, or until the dump temperature is reached, generally about 60° C. to about 120° C. In some embodiments, the order of addition for finalization may include first adding about 50% of the masterbatch, followed by the additional additives, and finally followed by the remaining 50% of the masterbatch. This order may be used to obtain better dispersion of curing chemicals, for example. One or more ram sweeps may be performed during finalization. The finalized elastomer composition is allowed to cool, and forming the cured (vulcanized) elastomer compositions of the present disclosure.

The cured elastomer composition may be processed and reprocessed by conventional rubber processing techniques, such as extrusion, injection molding, compression molding, and the like. Scrap or flashing may be salvaged and reprocessed, if desired.

In one embodiment, the elastomer composition comprises about 100 phr of brominated isobutylene-co-alkylstyrene, about 30 to 80 phr of reinforcing filler, about 0.3 to 20 phr of processing aid, about 0.02 to 2 phr of scorch retarder, about 0.5 to 10 phr of curing agent, about 0.1 to 6 phr of accelerator, and about 0.1 to 5 phr of activator.

In one embodiment, the elastomer composition comprises about 100 phr of brominated isobutylene-co-alkylstyrene, about 35 to 55 phr of reinforcing filler, about 3 to 17 phr of processing aid, about 0.05 to 0.15 phr of scorch retarder, about 0.5 to 8 phr of curing agent, about 0.5 to 3 phr of accelerator, and about 0.5 to 3 phr of activator.

In one embodiment, the elastomer composition comprises about 100 phr of brominated isobutylene-co-alkylstyrene, about 40 to 50 phr of reinforcing filler, about 5 to 15 phr of processing aid, about 0.1 to 0.2 phr of scorch retarder, about 1 to 6 phr of curing agent, about 1 to 1.4 phr of accelerator, and about 0.5 to 1 phr of activator.

The elastomer compositions described herein may be used in the manufacture of automotive vibration-damping devices, such as any device (component) used within an automobile for reducing vibration frequency. Such devices may include a hanger or other support that secures one or more automotive parts in place, such as a tubular member or pipe, including an exhaust pipe hanger and/or an associated exhaust pipe hanger mount (i.e., a mount to which the exhaust pipe hanger is attached to collectively mount one or more exhaust pipes). The elastomer compositions themselves may be characterized as having improved processability (e.g., improved mixing, as described herein below), as well as impart beneficial qualities, in addition to vibration damping, to the automotive vibration-damping device(s), such as temperature resistance, wear resistance, enhanced tensile stretch, tear resistance, scorch resistance, and the like, particularly as compared to traditional chlorobutyl rubber. It will be appreciated that although the elastomer composition of the present disclosure is described with reference to use in forming an automotive vibration-damping device, such as an exhaust pipe hanger, any other devices or components forming part of an automobile or any other structure that can benefit from the enhanced qualities of the elastomer compositions described herein may be composed of the disclosed elastomer compositions, without departing from the scope of the present disclosure.

Particular elastomer composition formulations and processing parameters for use in forming the automotive vibration-damping devices described herein are provided herein below.

INDUSTRIAL APPLICABILITY

The elastomer compositions of the present disclosure may be extruded, compression molded, blow molded, injection molded, and/or laminated into various shaped articles, including industrial parts such as automotive parts, appliance housings, consumer products, packaging, and the like.

In a particular embodiment, the elastomer compositions are useful in forming articles for a variety of automotive devices that require vibration damping when the automobile is in use, such as in forming an exhaust pipe hanger or an exhaust pipe hanger mount. The exhaust pipe hangers (or hanger mounts) formed using the elastomer compositions comprising brominated isobutylene-co-alkylstyrene described herein may comprise one or more points, such as two points, three points, or more points (multiple points). These points may be used to secure one or more exhaust pipes and to allow adjustment to fit one or more different types and/or sizes of exhaust pipe. The elastomer composition comprising the brominated isobutylene-co-alkylstyrene guards against exhaust pipe(s) movement, provides vibration damping, heat resistance, durability (e.g., hardness), and increased life cycle (e.g., greater performance over a greater period of time).

The elastomer compositions may either be fabricated into a finished device or a component of a finished device. For example, the elastomer compositions of the present disclosure may form all or a portion of a wide variety of automotive applications requiring vibration damping, such as exhaust pipe hangers, suspension bumpers and components, body mounts, and the like.

Elastomer Characteristics

As shown in the below examples, the elastomer composition exhibits certain characteristics, which makes it particularly useful as the composition forming all or part of an automotive vibration-damping device, such as an exhaust pipe hanger. The characteristics of the elastomer compositions of the present disclosure are described with reference to the elastomer composition itself and having been cured according to the examples described herein, as well as with reference to chlorobutyl rubber, which is typically used to form traditional automotive vibration-damping devices. Accordingly, the disclosed elastomer compositions provide an alternative to traditional chlorobutyl rubber for forming such devices, offering enhanced characteristics and advantages in processability of the elastomer composition and functionality of the particular device compared to currently used chlorobutyl rubber. Therefore, the present composition is substantially free of chlorobutyl rubber. As used herein, the term "substantially free" refers to less than 0.01 wt % based on the composition.

The characteristics of the elastomer compositions described below are based on formulations cured at 180° C., T90+2 min MDR for tensile properties, tear resistance, and hardness; and 180° C., T90+5 min MDR for compression set properties.

In some embodiments, the elastomer composition of the present disclosure comprising a brominated isobutylene-co-alkylstyrene exhibits a masterbatch dump temperature of greater than about 150° C., or about 150° C. to about 180° C., encompassing any value and subset there between, such as having a lower limit of about 150° C., 153° C., 156° C., 159° C., 162° C., or 165° C. to an upper limit of about 180° C., 177° C., 174° C., 171° C., 168° C., or 165° C., encompassing any value and subset there between. In certain embodiments, the masterbatch dump temperature of the elastomer compositions of the present disclosure are in the range of 155° C. to 175° C., or 160° C. to 170° C., encompassing any value and subset there between.

When compared to traditional chlorobutyl rubber, the masterbatch dump temperature of the elastomer compositions comprising brominated isobutylene-co-alkylstyrene described herein exhibit increased comparative dump temperatures to chlorobutyl rubber, the percent increase being in the range of about 8% to about 35%, encompassing any value and subset there between, such as a lower limit of about 8%, 11%, 14%, 17%, 20%, or 23% to an upper limit of about 35%, 32%, 29%, 26%, or 23%, encompassing any value and subset there between. In some embodiments, the masterbatch dump temperature of the elastomer compositions comprising brominated isobutylene-co-alkylstyrene described herein exhibit increased comparative dump temperatures to chlorobutyl rubber, the percent increase being in the range of about 9% to about 25%, encompassing any value and subset there between.

This increased dump temperature of the elastomer compositions comprising brominated isobutylene-co-alkylstyrene compared to traditional chlorobutyl rubber (e.g., the rubber traditionally used to make automotive vibration-damping devices) results in an increase in ease of mixing, which allows for shorter mixing times and corresponding energy savings in the mixing process.

In some embodiments, the elastomer composition of the present disclosure comprising a brominated isobutylene-co-alkylstyrene exhibits a T10 scorch safety time at 180° C. of greater than about 1 minute (min), or about 1 min to about 2 min, encompassing any value and subset there between, such as having a lower limit of about 1 min, 1.1 min, 1.2 min, 1.3 min, 1.4 min, or 1.5 min to an upper limit of about 1.5 min, 1.4 min, 1.3 min, 1.2 min, 1.1 min, or 1 min, encompassing any value and subset there between. In some embodiments, the elastomer composition of the present disclosure comprising a brominated isobutylene-co-alkylstyrene exhibits a T10 scorch safety time at 180° C. of about 1 min to about 1.5 min, or about 1 min to about 1.4 min, or about 1 min to about 1.3 min, or about 1.1 min to about 1.3 min, or about 1.2 min to about 1.3 min, encompassing any value and subset there between.

When compared to traditional chlorobutyl rubber, the T10 scorch safety time at 180° C. of the elastomer compositions comprising brominated isobutylene-co-alkylstyrene described herein exhibit increased comparative scorch safety times to chlorobutyl rubber, the percent increase being greater than about 50%, or in the range of about 50% to about 150%, encompassing any value and subset there between, such as a lower limit of about 50%, 60%, 70%, 80%, 90%, or 100% to an upper limit of about 150%, 140%, 130%, 120%, 110%, or 100%, encompassing any value and subset there between. In some embodiments, the T10 scorch safety time at 180° C. of the elastomer compositions comprising brominated isobutylene-co-alkylstyrene described herein exhibit increased comparative scorch safety times to chlorobutyl rubber, the percent increase being in the range of about 75% to about 150%, or about 75% to about 125%, or about 95% to about 120%, encompassing any value and subset there between.

This increased scorch safety, which is also applicable to other scorch time measurements, of the elastomer compositions of the present disclosure comprising brominated isobutylene-co-alkylstyrene as compared to traditional chlorobutyl rubber, allows for curing at higher temperatures (e.g., allowing for the increased dump temperatures discussed previously) to decrease curing time and broad vulcanization plateau. Moreover, the increased scorch safety of the elastomer compositions of the present disclosure allow for reduced scrap due to premature vulcanization.

The elastomer compositions of the present disclosure may exhibit elastic modulus values both before and after hot aging that are comparable or enhanced compared to traditional chlorobutyl rubber. Of particular significance, the elastomer compositions having the brominated isobutylene-co-alkylstyrene described herein have superior elastic modulus values at high temperatures (e.g., after hot aging (see Table 5)) compared to traditional chlorobutyl rubber. Accordingly, the elastomer compositions of the present disclosure are more resistant to plastic deformation compared to traditional chlorobutyl rubber, particularly at high temperatures.

In some embodiments, the elastomer compositions of the present disclosure may exhibit an elastic modulus at 100% before hot aging in the range of about 0.5 megapascal (mPa) to about 2.0 mPa; an elastic modulus at 200% before hot aging in the range of about 1.5 mPa to about 4.5 mPa; or an elastic modulus at 300% before hot aging in the range of about 3.0 mPa to about 7.5 mPa, encompassing any value and subset there between. In some embodiments, the elastomer compositions of the present disclosure may exhibit an elastic modulus at 100% after hot aging at 125° C. for 7 days in the range of about 1.0 mPa to about 3.0 mPa; an elastic modulus at 200% before hot aging in the range of about 2.5 mPa to about 5.5 mPa; or an elastic modulus at 300% before hot aging in the range of about 4.0 mPa to about 8.3 mPa, encompassing any value and subset there between. In some embodiments, the elastomer compositions of the present disclosure may exhibit an elastic modulus at 100% after hot aging at 175° C. for 3 days in the range of about 1.0 mPa to about 4.0 mPa; an elastic modulus at 200% before hot aging in the range of about 2.0 mPa to about 7.0 mPa; or an elastic modulus at 300% before hot aging in the range of about 3.5 mPa to about 10.5 mPa, encompassing any value and subset there between. The particular elastic modulus will depend on the ingredients and amount of ingredients in the elastomer composition, as well as the desired properties of the cured composition (e.g., what particular automotive vibration-damping device it will be used for).

The elastomer compositions of the present disclosure may exhibit tensile strength at break values both before and after hot aging that are comparable or enhanced compared to traditional chlorobutyl rubber. Of particular significance, the elastomer compositions having the brominated isobutylene-co-alkylstyrene described herein have superior elastic modulus values at high temperatures (e.g., after hot aging (see Table 5)) compared to traditional chlorobutyl rubber. Accordingly, the elastomer compositions of the present disclosure are more resistant to breaking upon experiencing tensile stresses compared to traditional chlorobutyl rubber, particularly at high temperatures. Such properties are particularly beneficial for use in forming automotive vibration-damping devices, which often experience a variety of forces, particularly at high temperatures (e.g., exposure to environmental conditions, engine heat, and the like).

The elastomer compositions of the present disclosure may exhibit a tensile strength at break before hot aging in the range of about 10.5 MPa to about 16.0 MPa, a tensile strength at break after hot aging for 7 days at 125° C. in the range of about 11.5 MPa to about 17.0 MPa, or a tensile strength at break after hot aging for 3 days at 175° C. in the range of about 8.0 MPa to about 14.0 MPa, encompassing any value and subset there between. The particular tensile strength at break value will depend on the ingredients and amount of ingredients in the elastomer composition, as well as the desired properties of the cured composition (e.g., what particular automotive vibration-damping device it will be used for).

Elongation at break is a measure of the strain a composition can withstand before breaking; it is a measure of the percentage change in length prior to breakage. Accordingly, a more ductile material will have a higher elongation at break than a more rigid material. The elastomer compositions described herein exhibit superior elongation at break values, particularly at high temperatures (e.g., after hot aging (see Table 5)) compared to traditional chlorobutyl rubber. Accordingly, the elastomer compositions of the present disclosure are more ductile compared to traditional chlorobutyl rubber, particularly at high temperatures, and thus more resilient, particularly for use in forming the automotive vibration-damping devices described herein. For example, in some embodiments, the elastomer compositions may exhibit an elongation at break value after hot aging 3 days at 175° C. of greater than about 350%, or in the range of about 350% to about 700%, encompassing any value and subset there between, such as a lower limit of about 350%, 385%, 420%, 455%, 490%, or 525% to an upper limit of about 700%, 665%, 630%, 595%, 560%, or 525%, encompassing any value and subset there between.

The amount of energy required to break a rubber composition is preferably relatively high, thereby requiring more work to damage or compromise the composition and devices made therefrom. This is particularly true in the embodiments of the present disclosure in which the disclosed elastomer composition may be used to form an automotive vibration-damping device, which experiences harsh temperature and force conditions. In some embodiments, the elastomer compositions of the present disclosure may exhibit an energy at break value before hot aging in the range of greater than about 12.5 joules (J), an energy at break value after hot aging for 7 days at 125° C. in the range of greater than about 11 J, and an energy at break value after hot aging for 3 days at 175° C. in the range of greater than about 2 J, encompassing any value and subset there between. The elastomer compositions of the present disclosure may exhibit an energy at break value before hot aging in the range of about 12.5 to 17 J, an energy at break value after hot aging for 7 days at 125° C. in the range of about 11 to about 16 J, and an energy at break value after hot aging for 3 days at 175° C. in the range of about 2 J to about 10 J, encompassing any value and subset there between.

When compared to traditional chlorobutyl rubber, the elastomer compositions comprising brominated isobutylene-co-alkylstyrene described herein exhibit increased comparative energy at break values to chlorobutyl rubber, the percent increase being typically greater than about 40%, or in the range of about 40% to about 900%, encompassing any value and subset there between, such as a lower limit of about 40%, 120%, 200%, 280%, 360%, 440%, or 520% to an upper limit of about 900%, 820%, 740%, 660%, 580%, or 500%, encompassing any value and subset there between. The elastomer compositions described herein exhibit comparatively higher increases in energy at break values compared to chlorobutyl rubber upon exposure to high temperatures, as is consistent with the other measurements described herein, demonstrating the consistent improvement of the disclosed compositions to heat resistance compared to traditional chlorobutyl rubber compositions.

The elastomer compositions of the present disclosure exhibit favorable tear resistance values, particularly as compared to traditional chlorobutyl rubber, thereby making them particularly useful as a composition forming an automotive vibration-damping device. In general, as heat is increased, the tear resistance of the elastomer compositions comprising brominated isobutylene-co-alkylstyrene do not significantly change, showing their resiliency to heat exposure. Differently, the tear resistance of traditional chlorobutyl rubbers (e.g., those traditionally used to form automotive vibration-damping devices) decrease markedly as heat exposure increases.

In some embodiments, the tear resistance or the elastomer compositions described herein is greater than about 30 newton per millimeter (N/mm) whether or not heat aged (e.g., exposed to increased temperatures). In some embodiments, the tear resistance of the elastomer compositions comprising brominated isobutylene-co-alkylstyrene is in the range of about 20 N/mm to about 50 N/mm, encompassing any value and subset there between, such as a lower limit of about 20 N/mm, 23 N/mm, 26 N/mm, 29 N/mm, 32 N/mm, or 35 N/mm to an upper limit of about 50 N/mm, 47 N/mm, 44 N/mm, 41 N/mm, 38 N/mm, or 35 N/mm, encompassing any value and subset there between.

When compared to traditional chlorobutyl rubber, the elastomer compositions comprising brominated isobutylene-co-alkylstyrene described herein exhibit increased tear resistance values to chlorobutyl rubber, the percent increase being typically greater than about 5%, or in the range of about 5% to about 350%, encompassing any value and subset there between, such as a lower limit of about 5%, 35%, 70%, 105%, 140%, or 175% to an upper limit of about 350%, 315%, 280%, 245%, 210%, or 175%, encompassing any value and subset there between. The elastomer compositions described herein exhibit comparatively higher increases in tear resistance values compared to chlorobutyl rubber upon exposure to high temperatures; that is, at high temperatures, the elastomer compositions of the present disclosure do not decline in their tear resistance characteristics, whereas chlorobutyl rubber significantly decreases in tear resistance upon exposure to heat, particularly high heat (e.g., heat greater than about 175° C.).

The elastomer compositions of the present disclosure exhibit a Shore A hardness of greater than about 45, or in the range of about 45 to about 80, encompassing any value and subset there between, such as a lower limit of about 45, 48.5, 52, 55.5, 59, or 62.5 to an upper limit of about 80, 76.5, 73, 69.5, 66, or 62.5, encompassing any value and subset there between. Generally, the elastomer compositions described herein do not decrease in hardness upon exposure to elevated heat, but remain substantially the same or increase in hardness. Differently, upon exposure to high heat (e.g., about 175° C., as hot aged herein), traditional chlorobutyl rubber compositions begin to decrease in hardness. The hardness of the elastomer composition may translate into durability over time, again demonstrating the improved life cycle of the elastomer compositions of the present disclosure, particularly as compared to traditional chlorobutyl rubber.

The elastomer compositions of the present disclosure may experience particularly beneficial compression set properties, among one or more additional beneficial properties described herein, making them particularly beneficial for use in automotive vibration-damping devices. Compression set testing measures the ability of rubber to return to its original thickness after prolonged compressive stresses at a given temperature and deflection. As a rubber material is compressed over time, it loses its ability to return to its original thickness. Accordingly, it is preferred that the elastomer compositions described herein exhibit relatively low compression set percentage, as the percentage measurement is a measure of the compositions ability to recover its original thickness. That is, if the composition is compressed and does not recover at all, it would have a 100% compression set, and if it recovered completely to its original thickness, it would have a 0% compression set. That is, the smaller the compression set value, the longer the life cycle of the composition and its effective use (i.e., improved life cycle and performance).

In some embodiments, the elastomer compositions of the present disclosure exhibit a compression set of less than about 80% applying a compression of 25% at 175° C. for 22 hours, or in the range of about 50% to about 80%, encompassing any value and subset there between, such as a lower limit of about 50%, 53%, 56%, 59%, 62%, or 65% to an upper limit of about 80%, 77%, 74%, 71%, 68%, or 65%, encompassing any value and subset there between. In certain embodiments, the compression set may be less than or about 75%, or less or than about 70%, or less or than about 65%, or less than or about 60%, encompassing any value and subset there between. When compared to traditional chlorobutyl rubber, the elastomer composition may have a decreased compression set value of greater than about 6%, or a decreased compression set value of greater than about 6% to about 35%, encompassing any value and subset there between, such as 6%, 9%, 12%, 15%, 18%, or 21% to an upper limit of greater than about 35%, 32%, 29%, 26%, 23%, or 20%, encompassing any value and subset there between.

The elastomer compositions described herein comprising brominated isobutylene-co-alkylstyrene exhibit the various property characteristics described herein, demonstrating superior vibration damping and heat resistance qualities. These characteristics are further superior when compared to traditional chlorobutyl rubber typically used in forming automotive vibration-damping devices. The heat resistance qualities further demonstrated in the ability of the elastomer compositions to retain their superior characteristics even upon exposure to elevated and high heat temperatures.

In some embodiments, the elastomer compositions of the present disclosure exhibit tensile strength at break retention of greater than about 50% after hot aging at 125° C. for 7 days or 175° C. for 3 days, or in the range of about 50% to about 120%, encompassing any value and subset there between, such as a lower limit of about 50%, 57%, 64%, 71%, 78%, or 85% to an upper limit of about 120%, 113%, 106%, 99%, 92%, or 85%, encompassing any value and subset there between. In certain embodiments, the elastomer compositions of the present disclosure exhibit tensile strength at break retention after hot aging at 125° C. for 7 days or 175° C. for 3 days of about 70% to about 120%, or about 80% to about 120%, or about 85% to about 115%, or about 85% to about 110%, encompassing any value and subset there between.

After hot aging for 125° C. for 7 days, in some embodiments, the tensile strength at break retention of the elastomer compositions described herein may be in the range of about 90% to about 120%, encompassing any value and subset there between; and after hot aging for 175° C. for 3 days, in some embodiments, the tensile strength at break retention of the elastomer compositions described herein may be in the range of about 50% to about 100%, encompassing any value and subset there between.

When compared to traditional chlorobutyl rubber, the elastomer compositions comprising brominated isobutylene-co-alkylstyrene described herein may exhibit increased tensile strength at break retention after hot aging at 125° C. for 7 days or 175° C. for 3 days as compared to chlorobutyl rubber. For example, after hot aging for 125° C. for 7 days, the percent increase in tensile strength at break retention may be greater than about 20% compared to traditional chlorobutyl rubber, or in the range of about 20% to about 50%, encompassing any value and subset there between, such as from a lower limit of about 20%, 23%, 26%, 29%, 32%, or 35% to an upper limit of about 50%, 47%, 44%, 41%, 38%, or 35%, encompassing any value and subset there between. After hot aging for 175° C. for 3 days, the percent increase in tensile strength at break retention may be greater than about 250% compared to traditional chlorobutyl rubber, or in the range of about 250% to about 600%, encompassing any value and subset there between, such as from a lower limit of about 250%, 285%, 320%, 355%, 390%, or 425% to an upper limit of about 600%, 565%, 530%, 495%, 460%, or 425%, encompassing any value and subset there between.

The elastomer compositions of the present disclosure may exhibit elongation at break retention of greater than about 60% after hot aging at 125° C. for 7 days or 175° C. for 3 days, or in the range of about 60% to about 110%, encompassing any value and subset there between, such as from a lower limit of about 60%, 65%, 70%, 75%, 80%, or 85% to an upper limit of about 110%, 105%, 100%, 95%, 90%, or 85%, encompassing any value and subset there between. In certain embodiments, the elastomer compositions of the present disclosure exhibit elongation at break retention after hot aging at 125° C. for 7 days or 175° C. for 3 days of about 60% to about 110%, or about 60% to about 100%, or about 60% to about 95%, encompassing any value and subset there between.

When compared to traditional chlorobutyl rubber, the elastomer compositions comprising brominated isobutylene-co-alkylstyrene described herein may exhibit increased elongation at break retention after hot aging at 125° C. for 7 days or 175° C. for 3 days as compared to chlorobutyl rubber. For example, after hot aging for 125° C. for 7 days, the percent increase in elongation at break retention may be greater than about 25% compared to traditional chlorobutyl rubber, or in the range of about 25% to about 50%, encompassing any value and subset there between, such as from a lower limit of about 25%, 27.25%, 30%, 32.5%, 35%, or 37.5% to an upper limit of about 50%, 47.5%, 45%, 42.5%, 40%, or 37.5%, encompassing any value and subset there between. After hot aging for 175° C. for 3 days, the percent increase in elongation at break retention may be greater than about 45% compared to traditional chlorobutyl rubber, or in the range of about 40% to about 120%, encompassing any value and subset there between, such as from a lower limit of about 40%, 50%, 60%, 70%, or 80% to an upper limit of about 120%, 110%, 100%, 90%, or 80%, encompassing any value and subset there between.

The elastomer compositions of the present disclosure may exhibit tear resistance retention of greater than about 50% after hot aging at 125° C. for 7 days or 175° C. for 3 days, or in the range of about 50% to about 120%, encompassing any value and subset there between, such as from a lower limit of about 50%, 57%, 64%, 71%, 78%, or 85% to an upper limit of about 120%, 113%, 106%, 99%, 92%, or 85%, encompassing any value and subset there between. In certain embodiments, the elastomer compositions of the present disclosure exhibit tear resistance retention after hot aging at 125° C. for 7 days or 175° C. for 3 days of about 50% to about 120%, or about 75% to about 120%, or 90% to about 120%, or about 90% to about 110%, encompassing any value and subset there between.

When compared to traditional chlorobutyl rubber, the elastomer compositions comprising brominated isobutylene-co-alkylstyrene described herein may exhibit increased tear resistance retention after hot aging at 125° C. for 7 days or 175° C. for 3 days as compared to chlorobutyl rubber. For example, after hot aging for 125° C. for 7 days, the percent increase in tear resistance retention may be greater than about 5% compared to traditional chlorobutyl rubber, or in the range of about 5% to about 25%, encompassing any value and subset there between, such as from a lower limit of about 5%, 7%, 9%, 11%, 13%, or 15% to an upper limit of about 25%, 23%, 21%, 19%, 17%, or 15%, encompassing any value and subset there between. After hot aging for 175° C. for 3 days, the percent increase in tear resistance retention may be greater than about 45% compared to traditional chlorobutyl rubber, or in the range of about 45% to about 225%, encompassing any value and subset there between, such as from a lower limit of about 45%, 63%, 81%, 99%, 117%, or 135% to an upper limit of about 225%, 207%, 189%, 171%, 153%, or 135%, encompassing any value and subset there between.

The various additives included in the elastomer compositions described herein comprising brominated isobutylene-co-alkylstyrene may, accordingly, and as further discussed below, to alter one or more of the beneficial properties of the elastomer composition to impart the level of desired characteristic, such as vibration damping (e.g., tensile strength, elongation, tear resistance, and the like), heat resistance, life cycle lengthening time, and the like. In all instances, one or more characteristics of the elastomer compositions of the present disclosure exhibit improved characteristics compared to chlorobutyl rubber, thereby making these compositions particularly suitable for use in forming all or parts of automotive vibration-damping devices, particularly those that encounter harsh environmental conditions (e.g., high temperature extremes).

EXAMPLES

Several elastomer compositions of the present disclosure were prepared and tested for comparison of the physical characteristics thereof compared to traditional chlorobutyl rubber, which served as a control. The measurement of the various properties of formulations described below at a given temperature are representative to one or more embodiments of formulating and curing the elastomer compositions of the present disclosure and are not meant to be limiting.

Test Formulations

One (1) chlorobutyl rubber control ("Control") and two (2) experimental elastomer compositions ("Exp 1" and "Exp 2") of the present disclosure comprising a brominated isobutylene-co-alkylstyrene were prepared having the masterbatch and finalized batch ingredients listed in Table 1. The selected brominated isobutylene-co-alkylstyrene for the experimental compositions was brominated isobutylene-co-para-methylstyrene. The symbol "-" herein means that the particular ingredient was not included in the formulation or that the particular test or unit is inapplicable.

TABLE 1

| Ingredient | Ingredient Type | Control (phr) | Exp 1 (phr) | Exp 2 (phr) |
| --- | --- | --- | --- | --- |
| Master Batch Formulation | | | | |
| Chlorobutyl Rubber | Rubber Component | 100.00 | — | — |
| Brominated Isobutylene-co-para-Methylstyrene | Rubber Component | — | 100.00 | 100.00 |
| Carbon black | Reinforcing Filler | 40.00 | 40.00 | 50.00 |
| Castor Oil | Processing Aid | — | — | 5.00 |
| Magnesium Oxide | Scorch Retarder | 0.20 | 0.10 | 0.10 |

TABLE 1-continued

| Ingredient | Ingredient Type | Control (phr) | Exp 1 (phr) | Exp 2 (phr) |
| --- | --- | --- | --- | --- |
| Stearic acid | Activator & Processing Aid | 1.00 | 0.50 | 0.50 |
| High Viscosity paraffinic oil | Processing Aid | 10.00 | 15.00 | — |
| Total (phr) | | 151.20 | 155.60 | 155.60 |
| Final Batch Formulation | | | | |
| Zinc oxide | Curing Agent | 5.00 | 2.00 | 3.00 |
| Octylphenol Formaldehyde Resin | Curing Agent | — | — | 3.00 |
| Mercaptobenzothiazole disulfide (MBTS) | Accelerator | 2.00 | 1.00 | 1.40 |
| Alkyl Phenol Disulfide | Curing Agent | — | 1.00 | — |
| Zinc dibutyldithiocarbamate (ZnBDC) | Accelerator | 1.50 | — | — |
| Total (phr) | | 159.70 | 159.60 | 163.00 |

The various ingredients used in the Examples disclosed herein are commercially available and their sources are shown in Table 2.

TABLE 2

| Ingredient | Source |
| --- | --- |
| Master Batch Formulation | |
| Chlorobutyl Rubber | EXXPRO ™ 3035, ExxonMobil Chemical Company, Houston, Texas |
| Brominated Isobutylene-co-para-Methylstyrene | EXXON ™ Chlorobutyl 1066, ExxonMobil Chemical Company, Houston, Texas |
| Carbon black | Carbon Black N330, SKI Carbon Black (India) Private Limited, Maharashtra, India |
| Castor Oil | CAS No. 8001-79-4, Loba Chemie Pvt. Ltd., Mumbai, India |
| Magnesium Oxide | STARMAG 150, Konoshima Chemical Co., Ltd., Osaka, Japan |
| Stearic acid | LUBSTRIC 995, Godrej Industries Limited, Mumbai, India |
| High Viscosity paraffinic oil | IPOL 2300, GP Petroleums Ltd. (previously Sah Petroleums), Mumbai, India |
| Final Batch Formulation | |
| Zinc oxide | Nav Bharat Metallic Industries, Mumbai, India |
| Octylphenol Formaldehyde Resin | SP-1045, SI Group, Inc., Schenectady, New York |
| Mercaptobenzothiazole disulfide (MBTS) | ACCEL DM, Kawaguchi Chemical Industry Co., Ltd., Tokyo, Japan |
| Alkyl Phenol Disulfide | VULTACT ™ 5, Arkema, Colombes, France |
| Zinc dibutyldithiocarbamate (ZnBDC) | ACCEL BZ, Kawaguchi Chemical Industry Co., Ltd., Tokyo, Japan |

Mixing Conditions of Test Formulations

Each of the Control, Exp 1, and Exp 2 compositions were prepared according to the mixing conditions shown in Table 3. A BANBURY™ 1.57 liter mixer and FAMM LTD was used, with a friction ration of 1:1.12 and a two wing tangential rotor.

TABLE 3

| Mixing Conditions | Unit | Control | Exp 1 | Exp 2 |
| --- | --- | --- | --- | --- |
| Masterbatch (MB) Formulation | | | | |
| Start Temperature | ° C. | 53 | 53 | 53 |
| Dump Temperature | ° C. | 128 | 140 | 157 |
| Mixing Time | second | 300 | 300 | 300 |
| Rotor Speed | RPM | 60 | 77 | 77 |
| Fill Factor | — | 0.80 | 0.80 | 0.80 |

TABLE 3-continued

Mixing Sequence for Control

| Time (second) | Addition Order |
|---|---|
| 0 | Rubber component |
| 90 | ⅔ Reinforcing Filler |
| 150 | Remaining Additives + ⅓ Reinforcing Filler |
| 210 | Ram Sweep |
| 300 | Batch Discharge @ <135° C. |

Mixing Sequence for Exp 1 & Exp 2

| Time (second) | Addition Order |
|---|---|
| 0 | Rubber component |
| 90 | ½ Reinforcing Filler |
| 150 | Remaining MB Additives + ½ Reinforcing Filler |
| 210 | Ram Sweep |
| 300 | Batch Discharge @ 160-170° C. |

Finalization Mixing Conditions

| | | | | |
|---|---|---|---|---|
| Start Temperature | ° C. | 50 | 43 | 43 |
| Dump Temperature | ° C. | 92 | 90 | 102 |
| Mixing Time | second | 120 | 120 | 120 |
| Rotor Speed | RPM | 30 | 40 | 40 |
| Fill Factor | — | 0.77 | 0.77 | 0.77 |

Mixing sequence for finalization of Control, Exp 1, & Exp 2

| Time (second) | Addition Order |
|---|---|
| 0 | ½ MB + Finalization Additives + ½ MB |
| 60 | Ram Sweep |
| 120 | Batch Discharge @ 100-105° C. |

Notably, the dump temperature of Exp 1 and Exp 2 is higher than of the Control formulation. Specifically, as shown in Table 3, Exp 1 has a dump temperature increase of about 9.38% compared to the Control and Exp 2 has a dump temperature increase of about 22.66% compared to the Control. This increased dump temperature results in an increase in ease of mixing, thereby enhancing processability of Exp 1 and Exp 2, as compared to the Control. The increased dump temperature may additionally allow for shorter mixing times and corresponding energy savings in the mixing process.

Cure Properties

Cure properties of the Control, Exp 1, and Exp 2 formulations were measured; Table 4 shows the Mooney viscosity, Mooney scorch, and rheological properties. Cure and scorch properties were measured according to ASTM D5289, using Alpha Technologies MV2000™ Mooney Viscometer, with rotation 2 RPM (having a temperature range of 30-200° C.) at the indicated temperature. The tested formulations were cured at the indicated temperature, typically from at 180° C. for cure properties, and 125° C. for scorch (processing temperature) properties.

The acronym "ML(1+4)" represents is the Mooney viscosity value of the tested compositions. The acronyms "MH" and "ML" refer to "maximum torque" and "minimum torque," respectively, each of which is measured in newton decimeters (d. Nm). The "MH-ML" values are a measure of the cure state, relating to the crosslink density of the cured formulation, where a higher MH-ML indicates a higher crosslink capability. The parameters including "ts" and "T" refer to scorch time (used interchangeably herein with "scorch safety") and cure time, respectively, each of which is measured in minutes (min). The acronym "CIR" refers to "cure rate index" and is determined by the equation: CRI=100/(T90−T10), and is a measure of the rate of cure (vulcanization) based on the difference between the optimum vulcanization (T90) and the scorch safety (T10).

The ML(1+4) Mooney viscosity value was measured at 100° C. The scorch property at ts5 was measured at 125° C., the value of which represents the time it takes for the viscosity of the particular formulation at 125° C. to increase 5 Mooney units above the ML.

Various rheological properties were tested using an Alpha Technologies MRD2000™ Moving Die Rheometer (biconical shaped die type, die oscillation amplitude of ±0.5°, frequency of 1.67±0.1 Hz (100 cycles per minute (CPM)), temperature range of 30-200° C., accuracy of ±0.3° C.) at 180° C. and 0.5 degree arc. The scorch property ts2 was measured at 180° C., the value of which represents the time it takes for the viscosity of the particular formulation at 180° C. to increase 2 Mooney units above the ML. The scorch property ts10 was measured at 180° C., the value of which represents the time it takes for the viscosity of the particular formulation at 180° C. to increase 10 Mooney units above the ML. The T10, T50, and T90 measure the time, in minutes, it takes the particular formulation to achieve a 10%, 50%, and 90% cure state, respectively, at 180° C. relative to their respective final cure states.

The ts2, ts5, and T10 values represent the scorch safety of the various formations. The ts2, ts5, and T10 values represent a measure of the premature vulcanization tendency of the test formulas, where larger values indicate a lower premature vulcanization tendency and, thus, increased ease of processing (e.g., more reliable processing using a wide range of equipment). The CRI is a measure of the rate of cure (vulcanization), where particularly long CRI values can cause reduced stability of the formulation and an increase in desirable properties of the cure, for example.

The cure properties of the Control, Exp 1, and Exp 2 formulations are shown in Table 4.

TABLE 4

| Parameter | Unit | Control | Exp 1 | Exp 2 |
|---|---|---|---|---|
| ML(1 + 4) (100° C.) | — | 55 | 60 | 84 |
| ts5 (125° C./60 minute) | minute | 17.4 | 19.2 | 27.7 |
| Rheometer (180° C./30 minute/±0.5° Arc) | | | | |
| ML | dNm | 1.4 | 1.5 | 2.5 |
| MH | dNm | 5.2 | 5.5 | 9.4 |
| MH − ML | dNm | 3.8 | 4.0 | 6.9 |
| ts2 | minute | 1.2 | 4.7 | 2.7 |
| T10 | minute | 0.6 | 1.2 | 1.3 |
| T50 | minute | 1.2 | 4.7 | 3.8 |
| T90 | minute | 2.4 | 11.2 | 9.2 |
| CRI (Cure Rate Index = 100/(T90 − T10) | minute$^{-1}$ | 169.5 | 28.7 | 40.7 |

As shown in Table 4, both Exp 1 and Exp 2 exhibit higher scorch safety as compared to the Control formulation (chlorobutyl rubber). Specifically, as shown in Table 4, Exp 1 has a ts5 at 125° C. increase of about 10.34%, a ts5 at 180° C. increase of about 291.67%, and a T10 at 180° C. of about 98% compared to the Control. Similarly, as shown in Table 4, Exp 2 has a ts5 at 125° C. increase of about 59.2%, a ts5 at 180° C. increase of about 125%, and a T10 at 180° C. of about 116.67% compared to the Control. FIG. 1 shows the T10 scorch safety at 180° C. results of Exp 1 and Exp 2 compared to the Control formulation. Accordingly, Exp 1 and Exp 2 exhibit increased resistance to premature vulcanization, and thus will result in less scrap during the curing process.

Notably, the CRI value of Exp 1 and Exp 2 is significantly lower as compared to the Control formulation (e.g., a decrease of 83.07% and 75.99%, respectively), which may further be indicative of the quality of the elastomer compositions described herein comprising brominated isobutylene-co-alkylstyrene. Such elastomer compositions, particularly when compared to traditional chlorobutyl rubber, may exhibit high stability (and increased as compared to chlorobutyl rubber) the formulation and a highly desirable cure properties (and increased compared to chlorobutyl rubber).

Performance Properties

Performance properties including the tensile properties of modulus values, tensile strength at break, elongation at break, and energy to break; tear properties; harness properties; and compression set properties of the cured Control, Exp 1, and Exp 2 formulations were generally measured at room temperature ("original") and after hot aging for 7 days at 125° C. or 3 days at 175° C. The formulations were cured at 180° C., T90+2 min using the rheometer described above for determining the performance properties listed in Table 5 below, except for compression set properties, in which the formulations were cured at 180° C., T90+5 min using the MDR. Tensile properties were measured according to ASTM D412, tear properties were measured according to ASTM D624 using Die C (crosshead speed pull of 20 inches/min (or 500 mm/min)), hardness properties were measured according to ASTM D2240, and compression set properties were measured according to ASTM D395. Tensile properties were determined with an INSRON™ Series 4462 testing machine, using a dumbbell shaped specimen Die C, having an overall length of 115 mm (4.53 inches) with a narrow section 33 mm (1.3 inches) long. This provides a gauge length (benchmark) of 25 mm (0.98 inch) long and a gauge width of 6 mm (0.24 inch) and a thickness of 2±0.1 mm (0.08±0.004 inches). For tear, an un-nicked test piece with a 90° angle, Die C having an overall length of 102 mm (0.47 inches) with a width of 19 mm (0.75 inches) and thickness of 2±0.1 mm (0.08±0.004 inches) was used. For hardness, a Wallace Instruments H17A/3 harness tester was used, the specimen having a thickness of at least 6 mm (0.24 inches). For compression set, Method B was used with a specimen thickness of 12.5±0.5 mm (0.49±0.02 inches) and a diameter of 29.0±0.5 mm (1.14±0.02 inches). The results are shown in Table 5 and demonstrate the improved properties of the elastomer composition comprising brominated isobutylene-co-alkylstyrene for use in vibration damping (e.g., enhanced values relating to tensile, tear, hardness, and compression set) and high temperature resistance, all contributing to enhanced (longer) life cycle and improved performance of the elastomer composition, particularly for use in forming automotive vibration-damping devices.

TABLE 5

| Parameter | Unit | Control | Exp 1 | Exp 2 |
|---|---|---|---|---|
| Tensile-Original (room temperature) | | | | |
| Modulus at 100% | MPa | 0.9 | 0.9 | 1.7 |
| Modulus at 200% | MPa | 1.7 | 1.8 | 4.0 |
| Modulus at 300% | MPa | 3.1 | 3.1 | 7.1 |
| Tensile Strength at Break | MPa | 12.1 | 11.2 | 15.4 |
| Elongation at Break | % | 780 | 790 | 660 |
| Energy at Break | J | 13.4 | 13.0 | 16.2 |
| Tensile-Hot air aging (7 days at 125° C.) | | | | |
| Modulus at 100% | MPa | 1.3 | 1.3 | 2.5 |
| Modulus at 200% | MPa | 2.8 | 2.5 | 5.1 |
| Modulus at 300% | MPa | 4.9 | 4.1 | 8.3 |
| Tensile Strength at Break | MPa | 10.2 | 12.1 | 16.2 |
| Elongation at Break | % | 540 | 740 | 620 |
| Energy at Break | J | 8.1 | 12.0 | 15.2 |
| Tensile-Hot air aging (3 days at 175° C.) | | | | |
| Modulus at 100% | MPa | 0.8 | 1.2 | 3.4 |
| Modulus at 200% | MPa | 1.3 | 2.3 | 6.7 |
| Modulus at 300% | MPa | 1.6 | 3.7 | 10.1 |
| Tensile Strength at Break | MPa | 1.7 | 8.2 | 13.4 |
| Elongation at Break | % | 310 | 660 | 410 |
| Energy at Break | J | 1.0 | 8.8 | 9.3 |
| Tear Resistance | | | | |
| Tear Strength-Original | N/mm | 31.3 | 32.9 | 40.9 |
| Tear Strength-Hot air aging (7 days at 125° C.) | N/mm | 29.1 | 32.7 | 44.7 |
| Tear Strength-Hot air aging (3 days at 175° C.) | N/mm | 10.7 | 30.7 | 42.9 |
| Hardness | | | | |
| Hardness-Original | Shore A | 45 | 45 | 57 |
| Hardness-Hot air aging (7 days at 125° C.) | Shore A | 50 | 51 | 72 |
| Hardness-Hot air aging (3 days at 175° C.) | Shore A | 41 | 50 | 78 |
| Compression Set | | | | |
| Compressed 25% for 22 hours at 175° C. | % | 86 | 97 | 61 |

As provided above, the curing conditions for tensile, tear, and hardness were 180° C., TC 90+2 MDR and for compression set were 180° C., T90+5 MDR. Table 5 demonstrates that both Exp 1 and Exp 2 exhibit comparable or increased elastic modulus values both before and after hot aging as compared to the Control formulation, with more dramatic increases after hot aging, indicating that the brominated isobutylene-co-alkylstyrene elastomer compositions of the present disclosure are more resistant to plastic deformation compared to traditional chlorobutyl rubber, particularly at high temperatures. Exp 2 exhibits higher modulus values both before and after hot aging at each of 100%, 200%, and 300% as compared to both the Control formulation and Exp 1. The difference between the elastic moduli of Exp 2 compared to Exp 1 may be attributed, without being bound to theory, to the addition of the octyl phenyl resin (octylphenol formaldehyde resin) curing agent that is excluded from Exp 1. Before hot aging, Exp 2 exhibits a 100% modulus increase of 88.89%, a 200% modulus increase of 135.29%, and a 300% modulus increase of 129.03% compared to the Control formulation. After hot aging at 125° C. for 7 days, Exp 2 exhibits a 100% modulus increase of 92.31%, a 200% modulus increase of 82.14%, and a 300% modulus increase of 69.39% compared to the Control formulation. After hot aging at 175° C. for 3 days, Exp 2 exhibits a 100% modulus increase of 325%, a 200% modulus increase of 415.38%, and a 300% modulus increase of 531.25% compared to the Control formulation.

Both Exp 1 and Exp 2 exhibit comparable or increased tensile strength at break values both before and after hot aging as compared to the Control formulation, with more dramatic increases after hot aging, indicating that the brominated isobutylene-co-alkylstyrene elastomer compositions of the present disclosure are more resistant breaking under tensile stress compared to traditional chlorobutyl rubber, particularly at high temperatures. This property is accordingly beneficial for use as a vibration-damping device where the elastomer composition is experiencing a variety of stresses (forces). Before hot aging, Exp 1 exhibits a comparable tensile strength at break, whereas Exp 2 exhibits an increase of 27.27% as compared to the Control formulation. After hot aging at 125° C. for 7 days, Exp 1 exhibits a tensile strength at break increase of 18.63% and Exp 2 exhibits an increase of 58.82% as compared to the Control formulation. After hot aging at 175° C. for 3 days, Exp 1 exhibits a tensile strength at break increase of 382.35% and Exp 2 exhibits an increase of 688.24% as compared to the Control formulation.

As shown in Table 5, the elastomer compositions described herein exhibit superior elongation at break values, particularly after hot aging at high temperature (175° C. for 3 days) compared to traditional chlorobutyl rubber. For example, after hot aging at 175° C. for 3 days, Exp 1 exhibits an elongation at break increase of 112.9% and Exp 2 exhibits an increase of 32.26% compared to the Control formulation.

Figure 2:
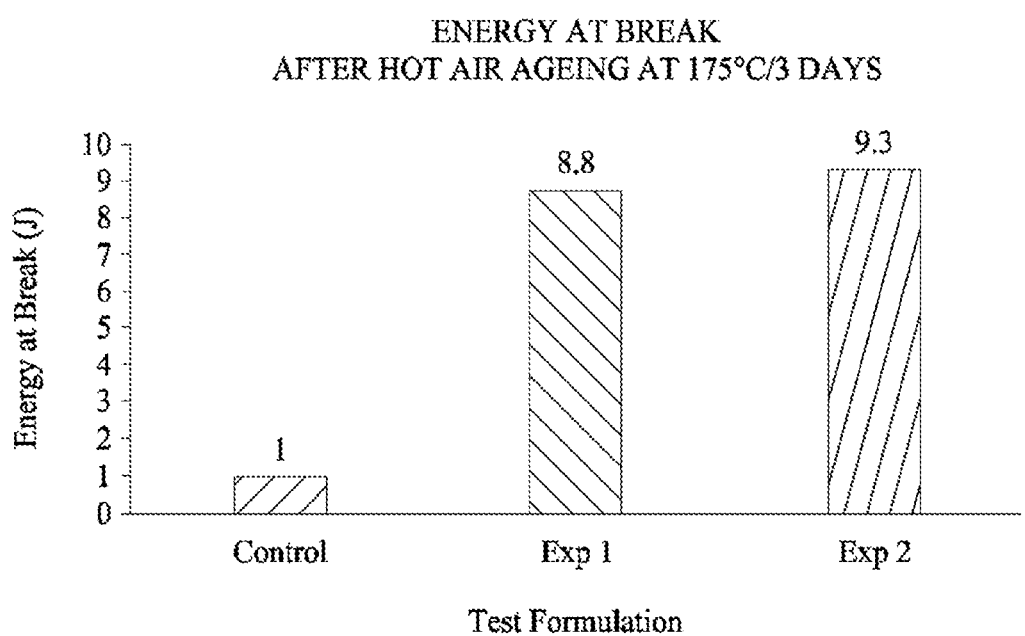
FIG. 2 shows elongation at break values after hot air aging for 3 days at 175° C. for elastomer compositions of the present disclosure comprising brominated isobutylene-co-alkylstyrene as compared to traditional chlorobutyl rubber compositions, according to one or more embodiments described herein.

With continued reference to Table 5, both Exp 1 and Exp 2 exhibit comparable or increased energy at break values both before and after hot aging as compared to the Control formulation. Exp. 2 exhibits higher energy at break values before and after hot aging as compared to both the Control and Exp 1 formulations, which, without being bound to theory, may be attributed to the presence of more stable C—C bonds and/or C-Resin-C curing bond development due to the presence of resin. In particular, both Exp 1 and Exp 2 show significant increased energy at break values after hot aging. After hot aging at 125° C. for 7 days, Exp 1 exhibits an energy at break increase of 48.15% and Exp 2 exhibits an energy at break increase of 87.65% compared to the Control formulation. After hot aging at 175° C. for 3 days, Exp 1 exhibits an energy at break increase of 780% and Exp 2 exhibits an energy at break increase of 830% compared to the Control formulation. This increased energy at break values, particularly after hot aging, demonstrate superior high heat resistance of the elastomer compositions comprising the brominated isobutylene-co-alkylstyrene disclosed herein compared to traditional chlorobutyl rubber. Such heat resistance translates into overall increased life cycle, particularly when used in forming the automotive vibration-damping devices described herein that are subject to harsh environmental conditions and extreme temperatures. FIG. 2 shows the energy at break results of Exp 1 and Exp 2 compared to the Control formulation after hot aging for 3 days at 175° C.

The tear resistance of Exp 1 and Exp 2, as compared to the Control formulation, are shown in Table 5, exhibiting an increase in tear resistance values both before and after hot aging, with more pronounced improvements after hot aging, demonstrating continued consistent enhanced temperature resistance properties of the elastomer compositions of the present disclosure. At all times, the tear resistance values were greater than about 30 N/mm Generally, Exp 2 shows increased tear resistance values compared to Exp 1, which is consistent with the measurements previously discussed. Before hot aging, Exp 1 exhibits a tear resistance increase of 5.79% and Exp 2 exhibits an increase of 31.51% as compared to the Control formulation. After hot aging at 125° C. for 7 days, Exp 1 exhibits a tear resistance increase of 12.37% and Exp 2 exhibits an increase of 53.61% as compared to the Control formulation. After hot aging at 175° C. for 3 days, Exp 1 exhibits a tear resistance increase of 186.92% and Exp 2 exhibits an increase of 300.93% as compared to the Control formulation.

With continued reference to Table 5, Shore A hardness measurements are provided for the Control, Exp 1, and Exp 2 formulations before and after hot aging. As shown, the Control, Exp 1, and Exp 2 exhibit comparable hardness before hot aging, and the Control and Exp 1 demonstrate comparable hardness levels at all hot aging conditions. Exp 2 exhibits increased hardness upon exposure to increased temperature hot aging, having a hardness increase after hot aging of 7 days at 125° C. of about 40% to 45% compared to both the Control and Exp 1 and a hardness increase after hot aging of 3 days at 175° C. of about 40% to 60% compared to both the Control and Exp 1. Generally, however, the Control formulation decreases substantially upon exposure to high heat (e.g., hot aging at 175° C.), whereas both Exp 1 and Exp 2 comprising the brominated isobutylene-co-alkylstyrene elastomer compositions of the present disclosure either maintain consistent hardness or increase in hardness as temperature exposure increases.

Figure 3:
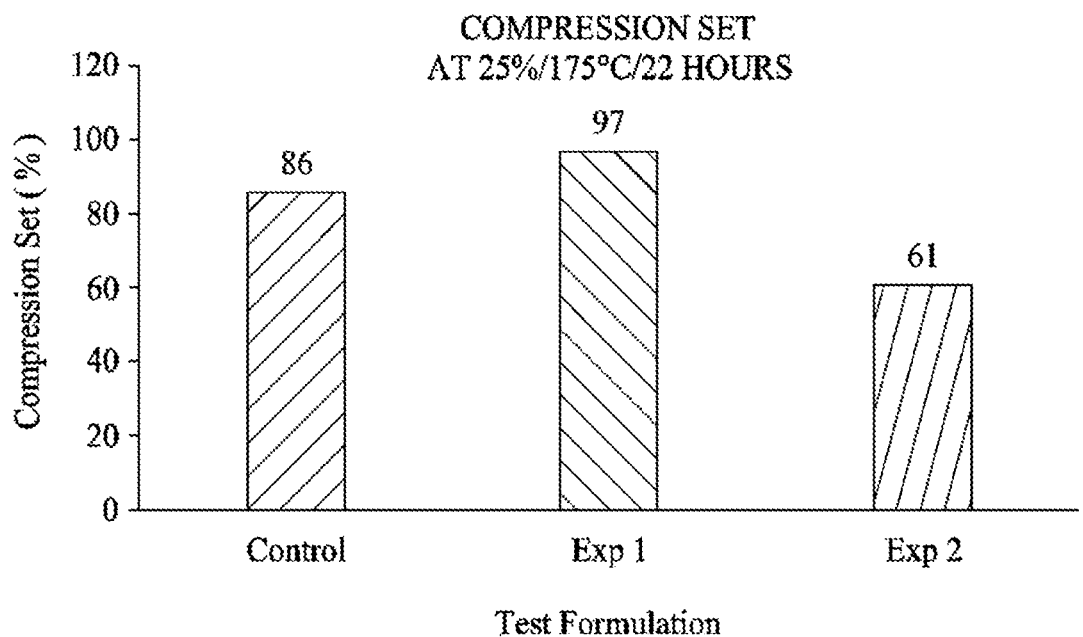
FIG. 3 shows compression set values measured at 25% compression and 175° C. for 22 hours for elastomer compositions of the present disclosure comprising brominated isobutylene-co-alkylstyrene as compared to traditional chlorobutyl rubber compositions, according to one or more embodiments described herein.

As shown in Table 5, the compression set properties of the Control, Exp 1, and Exp 2 formulations are provided. Compression set was measured at 25% compression and 175° C. for 22 hours. Exp 2 demonstrates superior compression set properties compared to both the Control and Exp 1 formulations, therefore exhibiting greater life cycle and improved performance. Exp 2 shows a compression set value of about 61%, representing a decrease in compression set value compared to the Control and Exp 1 formulations of 29.07% and 37.11%, respectively. FIG. 3 shows the compression set results of the Control, Exp 1, and Exp 2 formulations measured at 25% compression and 175° C. for 22 hours.

Retention Properties

The tensile retention properties of the Control, Exp 1, and Exp 2 formulations above were determined according to Equation 1:

$$\text{Property Retention (\%)} = \left(\frac{\text{Aged Property Value}}{\text{Original Property Value}}\right) * 100$$

The property retention values are shown in Table 6.

TABLE 6

| Parameter | Unit | Control | Exp 1 | Exp 2 |
|---|---|---|---|---|
| Retention-Hot air aging (7 days at 125° C.) | | | | |
| Retention Tensile Strength at Break | % | 84 | 108 | 105 |
| Retention Elongation at Break | % | 69 | 94 | 94 |
| Retention Tear Resistance | % | 93 | 99 | 109 |
| Retention-Hot air aging (3 days at 175° C.) | | | | |
| Retention Tensile Strength at Break | % | 14 | 73 | 87 |
| Retention Elongation at Break | % | 40 | 84 | 62 |
| Retention Tear Resistance | % | 34 | 93 | 105 |

Figure 4:
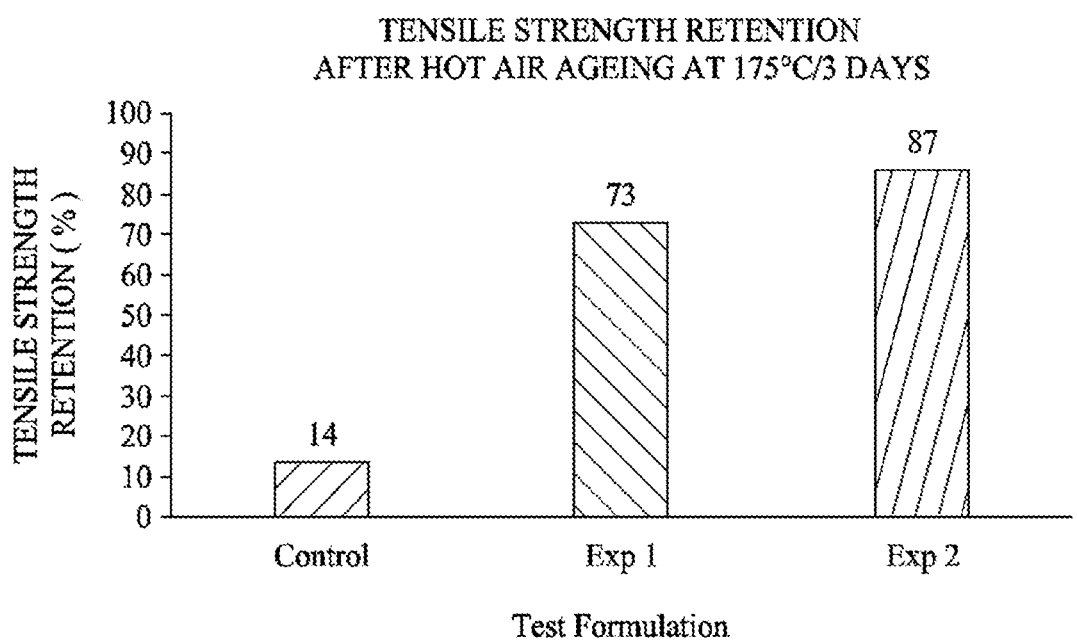
FIG. 4 shows tensile strength at break retention values after hot air aging for 3 days at 175° C. for elastomer compositions of the present disclosure comprising brominated isobutylene-co-alkylstyrene as compared to traditional chlorobutyl rubber compositions, according to one or more embodiments described herein.

As shown in Table 6, Exp 1 and Exp 2 exhibit superior tensile strength at break retention at both hot aging temperatures as compared to the Control formulation, particularly at the higher hot aging temperature, and accordingly the elastomer composition described herein maintain their vibration damping qualities and high heat resistance. At all times, the tensile strength at break retention is greater than about 50%. After hot aging at 125° C. for 7 days, Exp 1 exhibits a tensile strength at break resistance increase of 28.57% and Exp 2 exhibits an increase of 25% as compared to the Control formulation. After hot aging at 175° C. for 3 days, Exp 1 exhibits a tensile strength at break resistance increase of 421.43% and Exp 2 exhibits an increase of 521.43% as compared to the Control formulation. FIG. 4 shows the tensile strength at break retention results of the Control, Exp 1, and Exp 2 formulations after hot aging for 3 days at 175° C.

Figure 5:
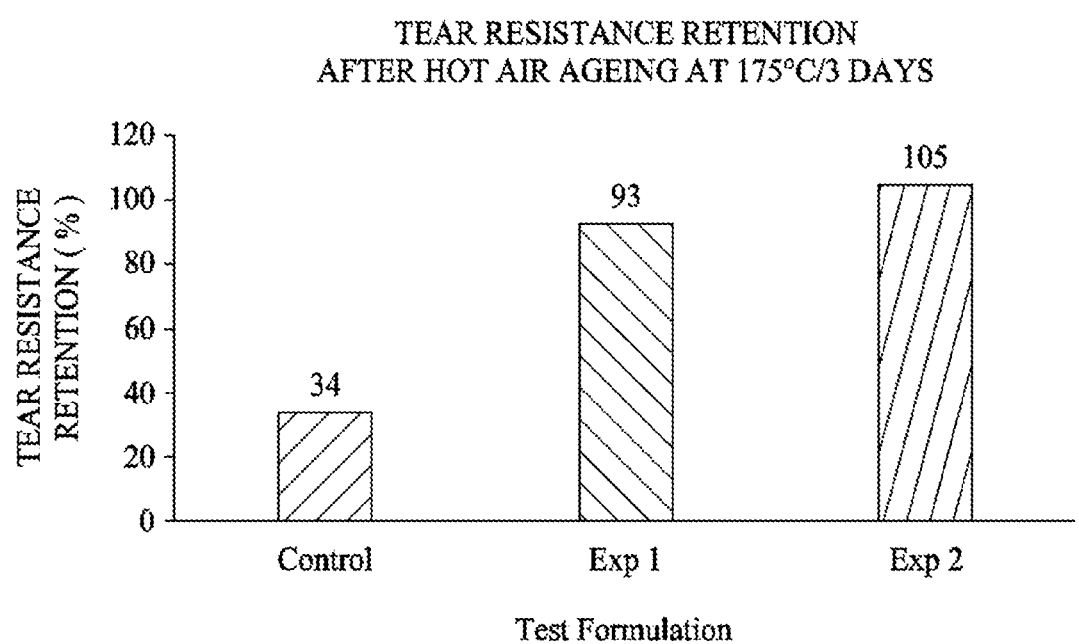
FIG. 5 shows tensile strength at break retention values after hot air aging for 3 days at 175° C. for elastomer compositions of the present disclosure comprising brominated isobutylene-co-alkylstyrene as compared to traditional chlorobutyl rubber compositions, according to one or more embodiments described herein.

Similar to the tensile strength at break retention, the elastomer compositions of the present disclosure comprising the brominated isobutylene-co-alkylstyrene further demonstrates their superior vibration damping and high heat resistance, having high elongation at break resistance and high tear resistance retention, even at high temperatures. At all times, the elongation at break retention is greater than about 60% and the tear resistance retention is greater than about 80% (or about 90%). After hot aging at 125° C. for 7 days, Exp 1 exhibits an elongation at break retention increase of 36.23% and Exp 2 exhibits an increase of 36.23% as compared to the Control formulation; after hot aging at 175° C. for 3 days, Exp 1 exhibits an elongation at break retention increase of 110% and Exp 2 exhibits an increase of 55% as compared to the Control formulation. After hot aging at 125° C. for 7 days, Exp 1 exhibits a tear resistance retention resistance increase of 6.45% and Exp 2 exhibits an increase of 17.2% as compared to the Control formulation; after hot aging at 175° C. for 3 days, Exp 1 exhibits a tear resistance retention increase of 173.53% and Exp 2 exhibits an increase of 208.82% as compared to the Control formulation. FIG. 5 shows the tear resistance retention results of the Control, Exp 1, and Exp 2 formulations after hot aging for 3 days at 175° C.

These retention values, improved as compared to traditional chlorobutyl rubber further demonstrate the heat resistances of the elastomer compositions of the present disclosure, which translates into improved life cycle and enhanced performance thereof, such as for use as composing an automotive vibration-damping device described herein.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments and examples illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. An elastomer composition comprising a brominated isobutylene-co-alkylstyrene polymer present in the elastomer composition in an amount of about 55% to about 80% by weight of the elastomer composition, and having:
   (i) a dump temperature of greater than about 150° C.;
   (ii) a T10 scorch safety time at 180° C. of greater than about 1 minute;
   (iii) a tensile strength at break retention after hot aging at 175° C. for at least 72 hours of greater than about 50%;
   (iv) a tear resistance retention after hot aging at 175° C. for at least 72 hours of greater than about 50%; and
   (v) an energy at break after hot aging at 175° C. for at least 72 hours of greater than 2 joules (J),
wherein the elastomer composition further comprises:
   (vi) carbon black in an amount of about 20% to about 50% by weight of the elastomer composition;
   (vii) magnesium oxide in an amount of about 0.05% to about 0.07% by weight of the elastomer composition;
   (viii) stearic acid in an amount of about 0.3% to about 0.4% by weight of the elastomer composition;
   (ix) zinc oxide in an amount of about 1% to about 2% by weight of the elastomer composition; and
   (x) mercaptobenzothiazole disulfide in an amount of about 0.5% to about 1% by weight of the elastomer composition.

2. The elastomer composition of claim 1, wherein the brominated isobutylene-co-alkylstyrene polymer is brominated isobutylene-co-methylstyrene polymer.

3. The elastomer composition of claim 2, wherein the brominated isobutylene-co-methylstyrene polymer is brominated isobutylene-co-para-methylstyrene.

4. An automotive vibration-damping device comprising the elastomer composition of claim 1.

5. The automotive vibration-damping device of claim 4, wherein the elastomer composition is substantially free of chlorobutyl rubber.

6. The automotive vibration-damping device of claim 4, wherein the vibration-damping device is an exhaust pipe hanger or exhaust pipe hanger mount.

* * * * *